D. C. Gately,
Belting Machine.
N° 26,265.    Patented Nov. 29, 1859.
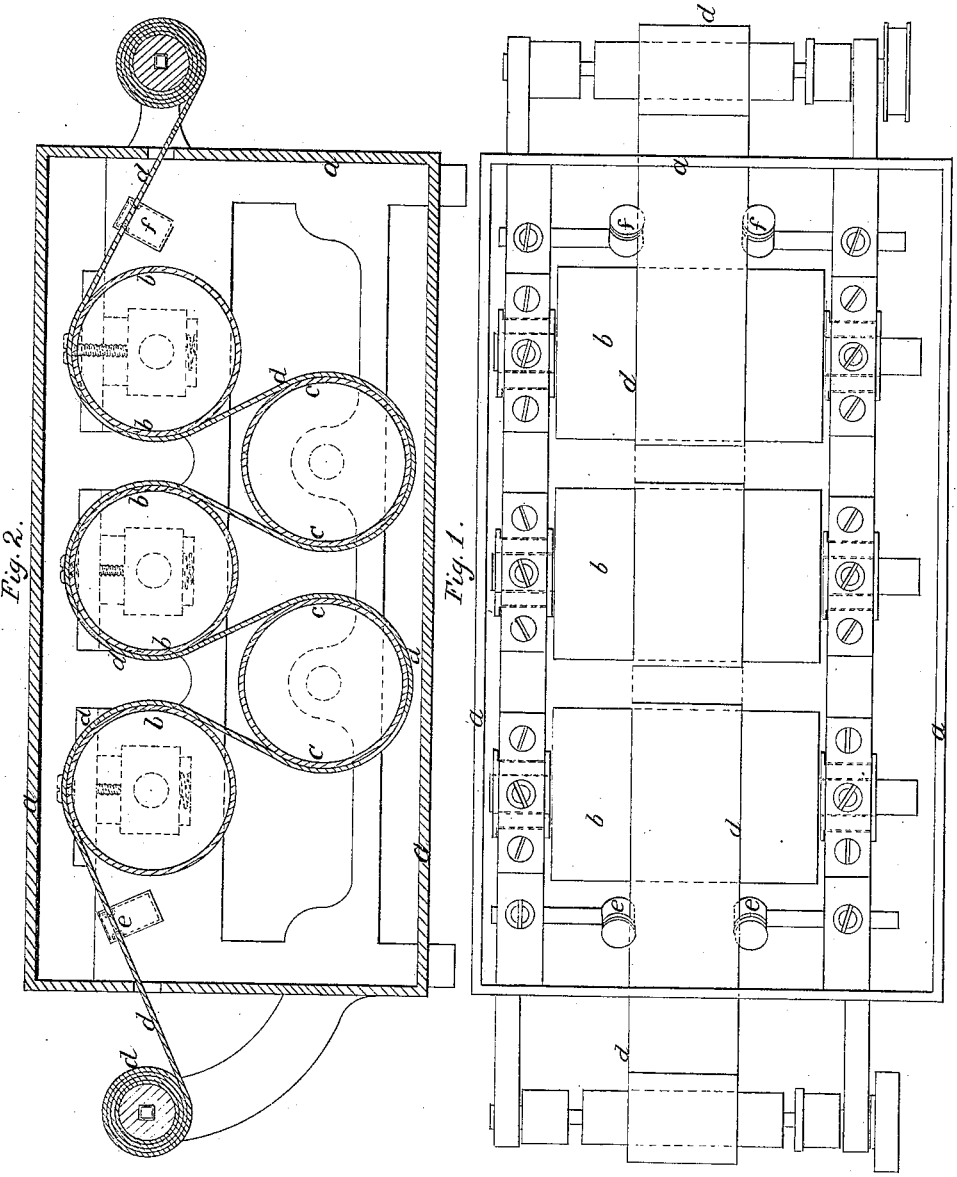
Witnesses
David Sanford
Wm C Perkins
Inventor
Dennis C Gately

UNITED STATES PATENT OFFICE.

DENNIS C. GATELY, OF NEWTOWN, CONNECTICUT.

MANUFACTURE OF RUBBER BELTING.

Specification of Letters Patent No. 26,265, dated November 29, 1859.

*To all whom it may concern:*

Be it known that I, DENNIS C. GATELY, of Newtown, in the county of Fairfield and State of Connecticut, have invented certain new and useful Improvements in the Manufacture of Belting or Banding Composed Either Wholly or in Part of India-Rubber or Gutta-Percha, and that the following description, taken in connection with the accompanying drawings hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The present invention consists in a new mode of vulcanizing belts or bands, composed either wholly or in part of india rubber or gutta percha, whereby a smooth friction surface is imparted to them during the process of vulcanization and so that the belt or band is fed along directly after it is made by the machine, or otherwise, and completed, by being vulcanized and receiving its smooth friction surface, in one continuous operation, instead of being rolled up and placed in ovens or heaters, which is the usual method employed after the belt or band is formed. The devices by which these results are effected, are represented in the accompanying drawings of which—

Figure 1 is a plan or top view of the machine, representing the top casing removed and Fig. 2 a central longitudinal vertical section of the same.

*a a a* in the drawings represent an outer casing or box inclosing a series of smooth hollow rolls *b b*, &c., *c c*, &c., which are internally heated by steam or in any other proper manner to the desired temperature and made to revolve, the rollers *c c* being placed in a lower position than the rollers *b b* as shown in the drawings. The belt or band *d d d*, after being formed in any proper manner, is fed between two small hollow rolls *e e* which are heated by steam or in any other suitable manner. These rolls *e e* heat the edges of the belt or band which is then passed over and under respectively the heated rolls *b b* and *c c* and finally between small rollers *f f*, which finish the vulcanization of the edges of the belt. By the mode above described of passing the belt or brand between the series of smooth heated rollers, the vulcanization will be completed without the necessity of rolling up the belt or band and placing it in ovens or heaters while at the same time a smooth friction surface will be imparted to the belt or band.

It will be evident that the rolls may be increased or diminished in number at pleasure and that when one surface only of the belt or band is to be acted upon that simple guiding rolls may be used in lieu of one set of hollow rolls.

The air in the chamber can be heated by steam or otherwise to add to the heat naturally given off by the rolls.

The belt may be partially vulcanized in the ordinary method if desired before passing it through the rolls according to the process described in an application for other belting patent by me.

The arrangement and position of the rolls for smoothing the surface of the belt and of the rolls to form and smooth the edges can be varied.

Having thus described my improvements I shall state my claim as follows:

What I claim as my invention and desire to have secured to me by Letters Patent is—

The manufacture of belting or banding composed either wholly or in part of india rubber or gutta percha, which consists in vulcanizing the belt or band and giving it a smooth friction surface at one operation, by feeding the belt or band around or in contact with a series of smooth heated rollers substantially as described.

DENNIS C. GATELY.

Witnesses:
A. POLLAK,
W. FAIRFAX.